US008907217B2

(12) United States Patent
Abu-Ali et al.

(10) Patent No.: US 8,907,217 B2
(45) Date of Patent: Dec. 9, 2014

(54) COMPOSITIONS FOR RISER AND PLENUM CABLES

(75) Inventors: Amjad F. Abu-Ali, Plainfield, IN (US); Gregg R. Szylakowski, Loveland, OH (US); Alice C. Albrinck, Hebron, KY (US)

(73) Assignee: General Cable Technologies Corporation, Highland Heights, KY (US)

( * ) Notice: Subject to any disclaimer, the term of this patent is extended or adjusted under 35 U.S.C. 154(b) by 452 days.

(21) Appl. No.: 13/024,758

(22) Filed: Feb. 10, 2011

(65) Prior Publication Data

US 2011/0198108 A1 Aug. 18, 2011

Related U.S. Application Data

(60) Provisional application No. 61/304,223, filed on Feb. 12, 2010.

(51) Int. Cl.
*H01B 7/00* (2006.01)
*H01B 3/44* (2006.01)
*C08K 5/12* (2006.01)
*C08K 5/00* (2006.01)
*C08L 91/06* (2006.01)
*C08K 5/02* (2006.01)

(52) U.S. Cl.
CPC ............ *C08K 5/0016* (2013.01); *H01B 3/443* (2013.01); *C08K 5/12* (2013.01); *C08L 91/06* (2013.01); *C08K 5/02* (2013.01)
USPC .............. 174/110 R; 174/119 R; 174/120 R; 174/121 R; 174/121 A

(58) Field of Classification Search
USPC ............ 174/110 R, 110 A, 36, 119 R, 119 C, 174/120 R, 121 R, 121 A, 121 AR, 121 SR, 174/122 R, 110 PM–110 E
See application file for complete search history.

(56) References Cited

U.S. PATENT DOCUMENTS

| | | | |
|---|---|---|---|
| 4,058,471 A | 11/1977 | Glatti et al. | |
| 4,154,892 A | 5/1979 | Glatti et al. | |
| 4,722,952 A * | 2/1988 | Hatt | 523/216 |
| 5,036,121 A | 7/1991 | Coaker et al. | |
| 5,756,570 A * | 5/1998 | Hoch et al. | 524/318 |
| 5,886,072 A | 3/1999 | Linsky et al. | |
| 6,255,374 B1 | 7/2001 | Sanchez et al. | |
| 8,053,507 B2 * | 11/2011 | Schmaucks | 524/493 |
| 2004/0002559 A1 * | 1/2004 | Troutman et al. | 524/100 |
| 2006/0079612 A1 * | 4/2006 | Troutman et al. | 524/99 |
| 2006/0079645 A1 * | 4/2006 | Hasegawa et al. | 525/191 |
| 2006/0135709 A1 * | 6/2006 | Hasegawa et al. | 525/474 |
| 2009/0022462 A1 * | 1/2009 | Papazoglou et al. | 385/123 |

FOREIGN PATENT DOCUMENTS

| | | |
|---|---|---|
| JP | H02-191651 A | 7/1990 |
| JP | 2001-234013 A | 8/2001 |
| JP | 2005-239795 A | 9/2005 |

OTHER PUBLICATIONS

Contreras, M. Soledad; Office Action issued in Chilean Patent Application No. 2233-12, dated Aug. 20, 2014; 6 pages.

* cited by examiner

*Primary Examiner* — William H Mayo, III
(74) *Attorney, Agent, or Firm* — Ulmer & Berne LLP

(57) ABSTRACT

Materials for making cable jackets, particularly riser and plenum cables, are provided. The materials provide low flammability and allow the cable to meet UL 910 or NFPA 262 or UL 1666 specifications. The material contains PVC resin, a plasticizer, a metal oxide particle, and optionally a brominated phthalate. Preferably, the metal oxide particle is spherical amorphous silicon dioxide. More preferably, the spherical amorphous silicon dioxide has a mean particle size of about 100-200 nm and/or a BET surface area of about 10-30 m$^2$/g. The metal oxide particle is also preferably metal oxide particle non-porous, non-ionic, and/or non-hydrated.

14 Claims, No Drawings

COMPOSITIONS FOR RISER AND PLENUM CABLES

This application claims the priority of U.S. Provisional Patent Application Ser. No. 61/304,223, filed Feb. 12, 2010, which is incorporated in its entirety herein by reference.

FIELD OF THE INVENTION

The present invention relates to materials for making cable jackets, particularly for riser and plenum cables. The materials provide low flammability and allow the cable to meet UL 910 or NFPA-262 or UL 1666 specifications.

BACKGROUND OF THE INVENTION

Buildings are usually designed with a space between a drop ceiling and a structural floor from which the ceiling is suspended to serve as a return air plenum for elements of heating and cooling systems as well as serving as a convenient location for the installation of communications cables and other equipment, such as power cables and data cables. Such data cables also called plenum cables. Alternatively, the building can employ raised floors used for cable routing and plenum space. Communications cables generally include voice communications, data and other types of signals for use in telephone, computer, control, alarm, and related systems, and it is not uncommon for these plenums and the cables therein to be continuous throughout the length and width of each floor, which can introduce safety hazards, both to the cables and the buildings.

When a fire occurs in an area between a floor and a drop ceiling, it may be contained by walls and other building elements which enclose that area. However, if and when the fire reaches the plenum space, and especially if flammable material occupies the plenum, the fire can spread quickly throughout the entire floor of the building. The fire can travel along the length of cables which are installed in the plenum if the cables are not rated for plenum use, i.e., do not possess the requisite flame and smoke retardation characteristics. Also, smoke can be conveyed through the plenum to adjacent areas and to other floors with the possibility of smoke permeation throughout the entire building.

As the temperature in a non-plenum rated jacketed cable rises, charring of the jacket material begins. Afterwards, conductor insulation inside the jacket begins to decompose and char. If the charred jacket retains its integrity, it still functions to insulate the core; if not, however, it ruptures due either to expanding insulation char or to pressure of gases generated from the insulation, and as a consequence, exposes the virgin interior of the jacket and insulation to the flame and/or the elevated temperatures. The jacket and the insulation begin to pyrolize and emit more flammable gases. These gases ignite and, because of air drafts in the plenum, burn beyond the area of flame impingement, thereby propagating flame thru the building and generating smoke and toxic and corrosive gases.

Because of the possibility of flame spread and smoke evolution, as a general rule, the National Electrical Code (NEC) requires that power-limited cables in plenums be enclosed in metal conduits. However, the NEC permits certain exceptions to this requirement. For example, cables without metal conduits are permitted, provided that such cables are tested and approved by an independent testing agent, such as Underwriters Laboratories (UL), as having suitably low flame spread and smoke generating or producing characteristics. The flame spread and smoke production of cables are measured using the UL 910 (1998 edition) or NFPA 262 (2011 edition), also known as the "Steiner Tunnel," standard test method for fire and smoke retardation characteristics of electrical and optical fiber cables used in air handling spaces, i.e., plenums.

A riser (CMR) rated cable is a cable that meets the UL1666 requirements. These cables are designed for installations in vertical trays between floors or through elevator shafts. The cable typically contains insulated wires twisted, and jacketed with a Riser type jacket. The purpose of this invention is to describe a composition of a PVC compound used as a jacket for these types of cables.

The most important property of a CMR cable is to pass the vertical burn UL1666 test. The test apparatus and procedure is detailed in UL1666, section 4. The test is done by installing finished cables in a chamber. The cables are then exposed to a continuous flame (at 154.5 KW) for 30 minutes. To pass the test, the flame propagation can not equal or exceed 12 feet beyond the ignition point, and the temperature can not exceed 850° F. as described in section 9 of UL1666.

One of the main obstacles to developing a polyvinyl chloride (PVC) jacket composition to meet the UL1666 specifications, is to maintain a low flammability during the 30 minute burn. To do so, formulators tend to add a significant amount of bromine (in the form of brominated phthalates) and antimony. Those two additives, along with aluminum trihydrate, can provide for low flammability. However, those additives are costly.

Therefore, there remains a need for jacket compositions for plenum and riser cable that provide low flammability, but can be made inexpensively.

SUMMARY OF THE INVENTION

In one embodiment, the present invention provides compositions for use as jacket or insulation for riser or plenum cable. The composition has been developed to meet UL 910 (1998 edition) and/or NFPA 262 (2011 edition) and/or UL 1666 (2007 edition) specifications and contains polyvinyl chloride (PVC) resin, a plasticizer, metal oxide particles, and optionally a brominated phthalate. Preferably, the metal oxide particle is spherical amorphous silicon dioxide. More preferably, the spherical amorphous silicon dioxide has a mean particle size of about 100-200 nm and/or a BET surface area of about 10-30 $m^2/g$. The metal oxide particle is also preferably metal oxide particle non-porous, non-ionic, and/or non-hydrated.

In another embodiment, the present invention provides a cable containing at least one wire and a jacket surrounding the wire. The jacket is made of a composition containing a PVC resin, a brominated phthalate, a plasticizer, and metal oxide particles. The cable meets UL 910 and/or NFPA 262 and/or UL 1666 specifications.

In yet another embodiment, the present invention provides methods for making PVC compositions for use as jacket or insulation for riser or plenum cable. The compositions are made by mixing a PVC resin, a brominated phthalate, a plasticizer, and metal oxide particles together to form a composite material.

In a further embodiment, the present invention provides methods for making plenum or riser cables that meet UL 910 and/or NFPA 262 and/or UL 1666 specifications. The cables are made by mixing a PVC resin, a brominated phthalate, a plasticizer, and metal oxide particles together to form a composite material; and surrounding the composite material around at least one wire to form a jacket. Preferably, the jacket formation is accomplished by extrusion.

DETAILED DESCRIPTION OF THE PREFERRED EMBODIMENTS

Polyvinyl chloride (PVC) resins that are appropriate for the present invention are medium or high molecular weight, general purpose vinyl suspension resins. Such PVC resins are well known in the art and are commercially available from numerous sources. A preferred PVC resin include GG-5415 which is commercially available from Georgia Gulf and is a high molecular weight general purpose vinyl suspension resin. The PVC resin is preferably present in the jacket composition, by weight percent, from about 30% to about 50%, more preferably from about 35% to about 45%, where 100% is the weight of the jacket composition.

The present composition may contain a brominated phthalate, which is a well known fire retardant used in polymer processing. Commonly available brominated phthalate include Pyronil 63 (brominated phthalate ester) available from Atochem in King of Prussia, Pa.; and DP-45 (tetrabromophthalate ester) available from Chemtura in Middlebury, Conn. Preferably, the brominated phthalate is present in the jacket composition from about 0 to about 20% by weight, more preferably less than 7%, most preferably about 2-4%.

Plasticizers are well-known in the art and are added to the composition to improve its flexibility and processing properties. Plasticizers appropriate for the present invention include, but are not limited to, diisodecyl phthalate, di(2-propyl heptyl)phthalate, n-octyl-n-decyl phthalates (mixed), diallyl phthalate, dioctyl sebacate, n-octyl-n-decyl trimellitate, triisooctyl trimellitate, isodecyl diphenyl phosphate, di-2-ethylhexyl adipate, di-2-ethylhexyl azelate, di-2-ethylhexyl sebacate, butyl benzyl sebacate, diisodecyl adipate, pentaerytritol ester, and acrylic acid-ethylene-vinyl acetate terpolymer. Preferably, the plasticizer is present in the jacket composition from about 10 to about 30% by weight, more preferably about 15-25%; and most preferably about 20%.

The micro oxide particles are oxides characterized by having a spherical shape and non-ionic character, i.e. without a positive or negative ionic valence, cannot form an ionic bond, mineral, or metal (element). Preferably the particles have a low surface area that imparts improved rheological and fire resistance properties. The BET surface area of the micro oxide particles is preferably about 10-30 $m^2/g$, more preferably about 18-22 $m^2/g$, and most preferably about 20 $m^2/g$. Preferred oxides include silicon, aluminum, magnesium and their double oxides. Zn and Fe oxides may also be suitable for some embodiments of the invention. Other oxides are envisioned to function in the invention but may not yet be available in the micro form described in the invention. Also, the metal oxide particles are preferably solid amorphous particles. The mean particle size of the metal oxide particles may be less than about 300 nm, and is preferably in the range of about 100-200 nm, more preferably about 150 nm. The concentration of the micro oxide particles may be about 1 to about 30% by weight of the jacket composition, and is preferably about 3-12%, and most preferred about 5%.

A preferred metal oxide particle is SIDISTAR® T 120, made by Elkem Silicon Materials, which is a spherically-shaped amorphous silicon dioxide additive designed for polymer applications. The average primary particle size of SIDISTAR® T 120 is 150 nm. When used with PVC, the SIDISTAR® T120 additive provides increased flame retardancy, which allows for the reduction of other expensive flame retardants (such as bromine and antimony compounds) in the composition while still meeting UL 910 or NFPA 262 or UL 1666 requirements. In the mixing process, SIDISTAR® T120 also improves the dispersion of all compound ingredients, providing well-balanced physical properties in the final composition. Because it is dispersed as primarily spherical particles, SIDISTAR® T120 also reduces internal friction and allows higher extrusion or injection speed as the result of better melt flow and therefore significant cost savings. Dispersion down to primary particles within the matrix enables a very fine cell formation, resulting in a reduction of high molecular weight processing aid and therefore much reduced raw material costs.

The composition can contain other components such as fillers, ultraviolet (UV) light absorbers, hindered amine light stabilizers (such as hindered amine light stabilizers (HALS)), antioxidants (such as phenolic antioxidants), colorants, lubricants (such as stearic acid), fluoropolymer (such as polytetrafluoroethylene (PTFE)), etc. Examples of suitable fillers include, but are not limited to, carbon black, clay, talc (aluminum silicate or magnesium silicate), magnesium aluminum silicate, magnesium calcium silicate, calcium carbonate, magnesium calcium carbonate, silica, ATH, magnesium hydroxide, sodium borate, calcium borate, kaolin clay, glass fibers, glass particles, or mixtures thereof.

Examples of suitable lubricants include, but are not limited to, stearic acid, silicones, anti-static amines, organic amities, ethanolamides, mono- and di-glyceride fatty amines, ethoxylated fatty amines, fatty acids, zinc stearate, stearic acids, palmitic acids, calcium stearate, lead stearate, zinc sulfate, and combinations thereof. Lubricants may be added to improve processing properties of the composition. However, some lubricants, such as silicone and fatty acid amides, also provide lubrication of the outer surface of the cable jacket to reduce friction during installation of the plenum or riser cable. Advantageous lubricants for friction reducing include, but are not limited to, oleamide, erucamide, stearamide, behenamide, oleyl palmitamide, strearyl erucamide, ethylene bis-stearamide, and ethylene bis-oleamide. Those lubricants are evenly distributed in the melt phase; however, as the polymer cools, the lubricants migrate to the surface of the composition to form a thin lubricating layer, which reduces the coefficient of friction between surfaces.

As an example, the inventive composition may also contain about 4 to 7% chlorinated paraffin wax, about 2 to 5% Ca—Zn stabilizer, about 1 to 5% antimony trioxide, about 0.5 to 2% zinc borates, about 0 to 30% calcium carbonates, about 1 to 30% aluminum trihydrate, about 0.2% or less of stearic acid, and/or about 1-10% PTFE.

Over all, aluminum trihydrate can be completely or partially replaced with calcium carbonate. Brominated phthalates and antimony can also significantly be reduced. To be able to pass the UL 910 or NFPA 262 or UL 1666 specifications, metal oxide is found to be a good char promoter and to be able to suppress flame propagation and smoke generation. Overall, those changes, when used with a PVC polymer, produce a significant cost reduction.

In a preferred embodiment of the present invention, the composition contains PVC, brominated phthalate, diisodecyl phthalate, calcium carbonate, and silicon dioxide. In another preferred embodiment of the present invention, the composition contains PVC, brominated phthalate, diisodecyl phthalate, chlorinated paraffin wax, Ca—Zn stabilizer, antimony trioxide, zinc borate, stearic acid, calcium carbonate, and silicon dioxide. In a further preferred embodiment of the present invention, the composition contains the ingredients and proportions shown in composition E of TABLE 1 below.

All of the components of the compositions utilized in the invention are usually blended or compounded together prior to their introduction into an extrusion device from which they are to be extruded onto at least one wire. The polymer and the other additives and fillers may be blended together by any of the techniques used in the art to blend and compound such mixtures to homogeneous masses. For instance, the components may be fluxed on a variety of apparatus including multi-roll mills, screw mills, continuous mixers, compounding extruders and Banbury mixers.

After the various components of the composition are uniformly admixed and blended together, they are further processed to fabricate the cables of the invention. Prior art methods for forming the composition into cable jackets or insulation are well known, and fabrication of the cable of the invention may generally be accomplished using any of the various extrusion methods.

The compositions of the invention, when used as a plenum or riser cable jacket, give surprisingly less flammability and lower smoke generation. As such, expensive flame retardants, such as brominated phthalate, antimony trioxide, or aluminum trihydrate can be reduced or eliminated from the composition.

Without further description, it is believed that one of ordinary skill in the art can, using the preceding description and the following illustrative examples, make and utilize the compounds of the present invention and practice the claimed methods. The following examples are given to illustrate the present invention. It should be understood that the invention is not to be limited to the specific conditions or details described in these examples.

EXAMPLES

In the examples, the compositions were mixed by a kneader, extruder, or rotary batch mixer. The wire jackets were extruded by a crosshead die attached to an extruder. Plaques were pressed in a heated press.

TABLE 1

| WIRE JACKETS (numbers are percent total composition) | | | | | |
|---|---|---|---|---|---|
| Ingredient | A | B | C | D | E |
| PVC resin 1.02 IV | 43.35% | 44.50% | 36% | 42.83% | 40.62% |
| Brominated phthalate | 5.64% | 4.90% | 5% | 5.57% | 1.22% |
| Electrical Grade diisodecyl phthalate | 14.30% | 15.58% | 17% | 0.00% | 18.28% |
| di(2-Propyl Heptyl) phthalate | 0.00% | 0.00% | 0 | 14.13% | 0.00% |
| Chlorinated Paraffin Wax | 6.07% | 4.68% | 10% | 6.00% | 5.69% |
| Calcium-Zinc Stabilizer | 2.82% | 2.67% | 3% | 3.00% | 2.84% |
| Aluminum Trihydrate | 0.00% | 23.59% | 25% | 8.57% | 0.00% |
| Antimony Trioxide | 1.73% | 4.01% | 4% | 1.71% | 1.62% |
| Zinc Borate | 1.30% | 0.00% | 0 | 1.28% | 1.22% |
| Stearic acid | 0.09% | 0.09% | 0 | 0.09% | 0.08% |
| Calcium Carbonates | 24.71% | 0.00% | 0 | 14.99% | 26.40% |
| Silicon Dioxide | 0.00% | 0.00% | 0 | 1.84% | 2.03% |
| Total | 100.00% | 100.00% | 100.00% | 100.00% | 100.00% |
| | 1.500 | 1.479 | 1.48 | 1.487 | 1.489 |
| Savings % | 11% | 0% | −0% | 11% | 22% |
| Tensile | 2435 | 2450 | | 2477 | 2382 |
| Elongation | 217 | 237 | | 182 | 259 |
| Aged Tensile | 2315 | 2450 | | 2549 | 2300 |
| Aged Elongation | 158 | 190 | | 113 | 205 |
| Aged tensile retention | 95% | 99% | | 103% | 97% |
| Aged Elong retention | 73% | 88% | | 62% | 79% |
| LTB | −11 | −11 | | −6.5 | −19 |
| LOI | 34.5 | 37 | | 36 | 33.5 |
| Thermal stability (minutes) | | 30 | | | 100 |
| Passed UL1666 flame? | Yes | NO | Yes | NA | Yes |

TABLE 2

| PLAQUES (numbers are per hundred parts PVC resin by weight) | | | | | | | |
|---|---|---|---|---|---|---|---|
| Ingredient | F | G | I | J | K | L | M |
| PVC Resin | 100 | 100 | 100 | 100 | 100 | 100 | 100 |
| Uniplex FRP-45 brominated phthalate | 15 | 15 | 15 | 15 | 15 | 15 | 15 |
| Platinol 610-TM (PX-336) plasticizer | 16 | 16 | 16 | 16 | 16 | 16 | 16 |
| Santicizer-2248 plasticizer | 22 | 22 | 22 | 22 | 22 | 22 | 22 |
| Therm Check RC203P mixed metal stabilizer | 7 | 7 | 7 | 7 | 7 | 7 | 7 |
| ATH-9400 aluminum trihydrate | 50 | 50 | 50 | 40 | 40 | 50 | 50 |
| Antimony Trioxide | 2 | 2 | 2 | 2 | 2 | 2 | 2 |
| Charmax BZMa smoke suppressant | 40 | 40 | 40 | 40 | 40 | 40 | 40 |
| Stearic acid | 0.21 | 0.21 | 0.21 | 0.21 | 0.21 | 0.21 | 0.21 |
| Loxiol G40 lubricant | 0.5 | 0.5 | 0.5 | 0.5 | 0.5 | 0.5 | 0.5 |

TABLE 2-continued

| PLAQUES (numbers are per hundred parts PVC resin by weight) | | | | | | | |
|---|---|---|---|---|---|---|---|
| Ingredient | F | G | I | J | K | L | M |
| Silicon dioxide powder | 0 | 5 | 5 | 0 | 0 | 5 | 10 |
| PTFE | 0 | 5 | 5 | 5 | 10 | 0 | 0 |
| Zinc Borate | 0 | 0 | 3 | 0 | 0 | 0 | 0 |
| Calcium carbonate | 0 | 0 | 0 | 10 | 10 | 0 | 0 |
| Tensile (psi) | 2193 | 1972 | 2008 | 1989 | 2098 | 2020 | 1998 |
| Elongation % | 183 | 173 | 169 | 180 | 190 | 182 | 170 |
| Aged Tensile (psi) | 2048 | 1872 | 1916 | 1899 | 1943 | 1981 | 1930 |
| Aged Elongation % | 158 | 142 | 130 | 166 | 172 | 162 | 137 |
| Tensile Retention (%) | 93 | 95 | 95 | 95 | 93 | 98 | 97 |
| Elongation Retention % | 86 | 82 | 77 | 92 | 91 | 89 | 81 |
| *LOI % | 41 | 38 | 40 | 36.5 | 38 | 42 | 42.5 |
| **LTB (° C.) | −5.5 | −3 | −2 | −2 | −6 | −2 | 0 |
| Smoke Density Flaming | 153 | 138 | 140 | 140 | 128 | 107 | 121 |
| Smoke Density non-flaming | 132 | | | 61 | 53 | 71 | 118 |

*LOI: Limited Oxygen Index (ASTM D2863)
**LTB: Low Temperature Brittleness (ASTM D746)

While the present invention has been described and illustrated by reference to particular embodiments thereof, it will be appreciated by those of ordinary skill in the art that the invention lends itself to variations not necessarily illustrated herein. For this reason, then, reference should be made solely to the appended claims for the purposes of determining the true scope of this invention.

What is claimed is:

1. A composition comprising:
   a) a polyvinyl chloride (PVC) resin;
   b) a plasticizer;
   c) silicon dioxide particles having a mean particle size of less than about 300 nm and a BET surface area of about 10-30 m2/g; and
   d) about 7% or less by weight of a brominated phthalate.

2. The composition of claim 1, wherein the plasticizer is diisodecyl phthalate or di(2-propyl heptyl)phthalate.

3. The composition of claim 1, wherein component a) is about 30-50% by weight of the composition.

4. The composition of claim 1, wherein component b) is about 10-20% by weight of the composition.

5. The composition of claim 1, wherein component c) is about 1-30% by weight of the composition.

6. The composition of claim 1, wherein the silicon dioxide particles are essentially solid and non porous.

7. The composition of claim 1, further comprising about 4 to 7% chlorinated paraffin wax, about 2 to 5% Ca—Zn stabilizer, about 1 to 5% antimony trioxide, about 0.5 to 2% zinc borates, about 0 to 30% calcium carbonates, about 1 to 30 aluminum trihydrate, about 0.2% or less of stearic acid, and/or about 1-10% polytetrafluoroethylene (PTFE).

8. A plenum or riser cable comprising a plurality of wires surrounded by a jacket, wherein the jacket comprises:
   a) a polyvinyl chloride (PVC) resin;
   b) a plasticizer;
   c) silicon dioxide particles having a mean particle size of less than about 300 nm and a BET surface area of about 10-30 m2/g; and
   d) about 7% or less by weight of a brominated phthalate.

9. The cable of claim 8, wherein the plasticizer is diisodecyl phthalates or di(2-propyl heptyl)phthalates.

10. The cable of claim 8, wherein component a) is about 30-50% by weight of the composition.

11. The cable of claim 8, wherein component b) is about 10-20% by weight of the composition.

12. The cable of claim 8, wherein component c) is about 1-30% by weight of the composition.

13. The cable of claim 8, wherein the silicon dioxide particles are essentially solid and non porous.

14. The cable of claim 8, further comprising about 4 to 7% chlorinated paraffin wax, about 2 to 5% Ca—Zn stabilizer, about 1 to 5% antimony trioxide, about 0.5 to 2% zinc borates, about 0 to 30% calcium carbonates, about 1 to 30 aluminum trihydrate, about 0.2% or less of stearic acid, and/or about 1-10% polytetrafluoroethylene (PTFE).

* * * * *

UNITED STATES PATENT AND TRADEMARK OFFICE
CERTIFICATE OF CORRECTION

| | | |
|---|---|---|
| PATENT NO. | : 8,907,217 B2 | Page 1 of 1 |
| APPLICATION NO. | : 13/024758 | |
| DATED | : December 9, 2014 | |
| INVENTOR(S) | : Amjad F. Abu-Ali et al. | |

It is certified that error appears in the above-identified patent and that said Letters Patent is hereby corrected as shown below:

In the Claims,
Claim 7, column 8, line 21, change "1 to 30" to --1 to 30%--; and
Claim 14, column 8, line 45, change "1 to 30" to --1 to 30%--.

Signed and Sealed this
Twenty-fourth Day of March, 2015

Michelle K. Lee
*Director of the United States Patent and Trademark Office*